Patented Sept. 8, 1931

1,822,367

UNITED STATES PATENT OFFICE

PAUL NAWIASKY, OF LUDWIGSHAFEN-ON-THE-RHINE, AND OTTO BRAUNSDORF AND EDUARD HOLZAPFEL, OF HOCHST-ON-THE-MAIN, GERMANY, ASSIGNORS, BY MESNE ASSIGNMENTS, TO GENERAL ANILINE WORKS, INC., OF NEW YORK, N. Y., A CORPORATION OF DELAWARE

MANUFACTURE OF VAT DYESTUFFS

No Drawing. Application filed November 23, 1925, Serial No. 71,021, and in Germany April 6, 1925.

We have found that valuable intermediates and very valuable vat dyestuffs containing halogen and dyeing from violet to blue shades can be obtained by acting on Bz-1.Bz-1'-benzanthronyl sulfids with halogenating agents and treating the intermediary products so obtained containing halogen and sulfur with alkaline condensing agents.

The following examples will serve to further illustrate how our invention is carried out in practice, but the invention is not limited to these examples. The parts are by weight.

In order to convert the intermediate into a vat dyestuff, 5 parts of the dry reaction product are introduced at a temperature of 140 degrees to 145 degrees centigrade into a melt prepared from 30 parts of caustic potash and 25 parts of ethyl alcohol, and kept at this temperature for about half an hour to one hour. The mixture is diluted with water and worked up in the usual manner. A dyestuff containing chlorine is obtained which dyes cotton from a reddish blue vat strong violet shades of excellent fastness and which is believed to have the formula

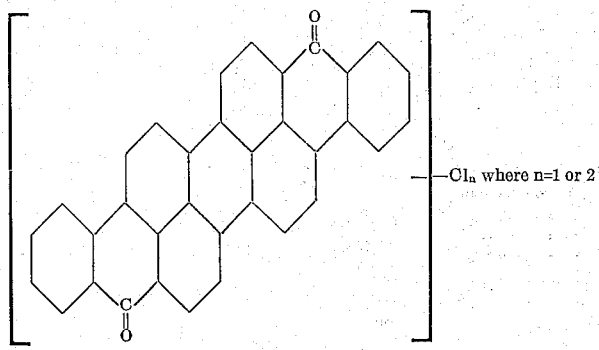

—$Cl_n$ where n=1 or 2

Example 1

15 parts of Bz-1.Bz-1'-benzanthronyl sulfid corresponding to the formula

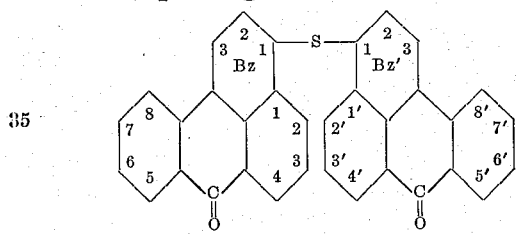

are suspended in 150 parts of nitrobenzene. The mixture is heated, while stirring, to 45 degress to 50 degrees centigrade, at which temperature 15 parts of sulfuryl chlorid are added, and then kept for an hour at 50 degrees centigrade, for one more hour at 60 degrees centigrade and finally for an additional hour at 75 degrees to 80 degrees centigrade, whereupon it is allowed to cool. The precipitated product is filtered off and freed from nitrobenzene in the usual manner.

Example 2

10 parts of Bz-1.Bz-1'-benzanthronyl sulfid are dissolved in 100 parts of sulfuric acid mono-hydrate and mixed with 7 parts of bromine. The mixture is slowly heated to 58 degrees centigrade in the course of 2 hours which temperature is then maintained for an additional hour, whereupon the mass is allowed to cool slowly. When cool, the sulfuric acid solution is poured into water and the precipitate worked up in the usual manner. A product containing bromine is obtained.

In order to obtain a vat dyestuff the brominated product is condensed by means of potassium alcoholate in the manner described in Example 1, but preferably at from 110 degrees to 120 degrees centigrade instead of from 140 degrees to 145 degrees centigrade. A dyestuff containing bromine is obtained which dyes cotton from a reddish blue vat strong blue-violet shades. It can be obtained in a purer condition by fractionally precipitating from sulfuric acid in the usual manner.

The dyestuff thus obtained is believed to have the formula

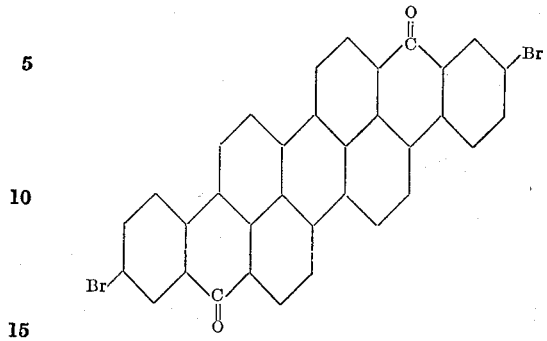

The dyeings obtained with the said purified dyestuff after being boiled with soap solution, washed and dried at room temperature, assume a reddish tinge only to a practically imperceptible degree when spotted with water.

We claim:

1. The process of manufacturing from violet to blue vat dyestuffs containing halogen which comprises acting on a Bz-1.Bz-1'-benzanthronyl sulfid with a halogenating agent and treating the intermediary product so obtained with an alkaline condensing agent.

2. The process of manufacturing a vat dyestuff dyeing cotton from a reddish-blue vat strong bluish-violet shades, which comprises brominating Bz-1.Bz-1'-benzanthronyl sulfid dissolved in sulfuric acid at 58° C. and condensing the product thus obtained by means of potassium alcoholate.

3. As a new article of manufacture a vat dyestuff which is believed to correspond to the formula

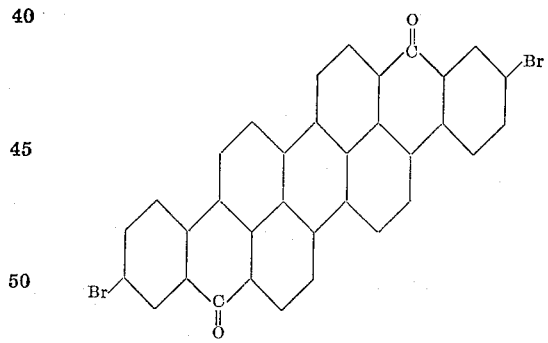

and which dyes cotton from a reddish blue vat strongly bluish violet shades of excellent fastness which after being boiled with soap solution and being washed and dried at room temperature when spotted with water assume a reddish tinge only in a practically imperceptible degree.

In testimony whereof we have hereunto set our hands.

PAUL NAWIASKY.
OTTO BRAUNSDORF.
EDUARD HOLZAPFEL.